United States Patent
Rajkovich

[19]

[11] Patent Number: 6,079,122
[45] Date of Patent: Jun. 27, 2000

[54] WEIGHING DRYER

[76] Inventor: Thomas Russell Rajkovich, c/o Comet Automation Systems, Inc., 2220 W. Dorothy La., Dayton, Ohio 45439

[21] Appl. No.: 09/143,264

[22] Filed: Aug. 28, 1998

[51] Int. Cl.[7] .................................................... F26B 13/12
[52] U.S. Cl. .................................. 34/574; 34/89; 73/433; 432/37
[58] Field of Search .............................. 34/480, 483, 485, 34/80, 89, 165, 166, 168, 486, 526, 527, 535, 536, 543, 545, 562, 572, 573, 574; 432/37, 58; 110/245; 73/433, 435, 436

[56] References Cited

U.S. PATENT DOCUMENTS

| | | | |
|---|---|---|---|
| 3,875,683 | 4/1975 | Waters | 34/174 |
| 4,480,706 | 11/1984 | Rosenthal | 177/50 |
| 4,481,985 | 11/1984 | Bruder er al. | 141/1 |
| 4,580,644 | 4/1986 | Nishiyama | 177/50 |
| 4,619,336 | 10/1986 | Boyer et al. | 177/1 |
| 4,693,330 | 9/1987 | Uchimura et al. | 177/25.14 |
| 5,033,208 | 7/1991 | Ohno et al. | 34/168 |
| 5,148,943 | 9/1992 | Moller | 222/1 |
| 5,165,180 | 11/1992 | Ogiri et al. | 34/495 |
| 5,226,241 | 7/1993 | Goodwin | 34/493 |
| 5,475,933 | 12/1995 | Ueda | 34/90 |
| 5,487,225 | 1/1996 | Downie | 34/473 |
| 5,566,470 | 10/1996 | Morrison | 34/167 |
| 5,604,994 | 2/1997 | Annen et al. | 34/314 |

OTHER PUBLICATIONS

Doub, Jr., John W., "The Basics of Resin Drying: How and Why Dryers Work", *Plastics Auxiliaries*. Jul./Aug., 1998, pp. 12–15.

*Primary Examiner*—Pamela A. Wilson
*Attorney, Agent, or Firm*—Killworth, Gottman, Hagan & Schaeff, L.L.P.

[57] ABSTRACT

A dryer is provided which is adapted to receive and dry polymeric material. The dryer comprises a support structure, a drying hopper assembly, a polymeric material supply device and a controller. The drying hopper assembly includes a drying hopper having an inlet for receiving wet polymeric material to be dried and an outlet through which dry polymeric material exits the hopper, and load cell apparatus associated with the support structure and the drying hopper for sensing the weight of the drying hopper and any polymeric material contained therein. The load cell apparatus generates first signals representative of the weight of the drying hopper and any contents it may have. The polymeric material supply device is adapted to supply wet polymeric material to the drying hopper through the material inlet. The controller is coupled to the polymeric material supply device and the load cell apparatus. It receives the first signals generated by the load cell apparatus and controls the operation of the polymeric material supply device based thereon.

17 Claims, 3 Drawing Sheets

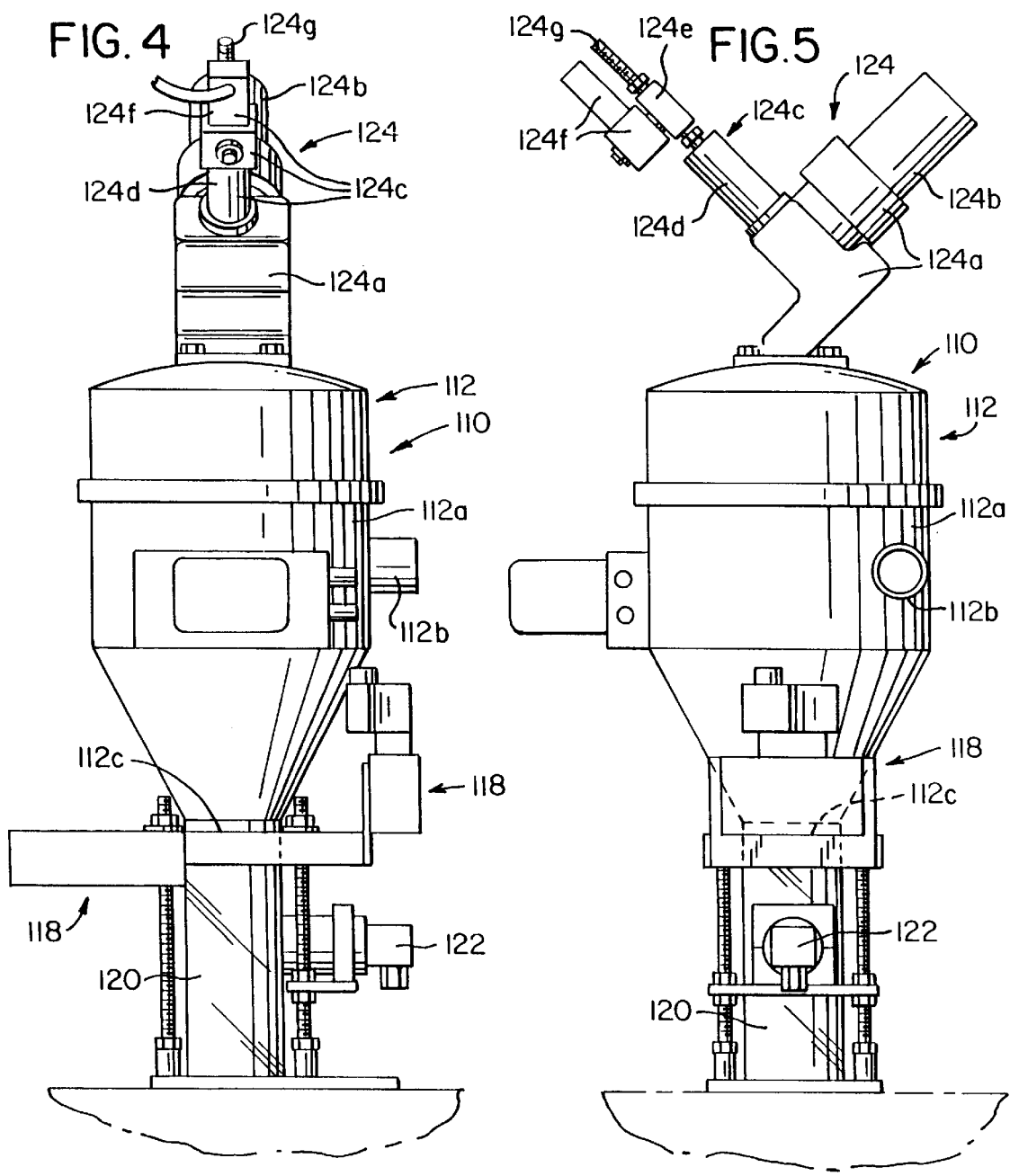

WEIGHING DRYER

BACKGROUND OF THE INVENTION

The present invention relates to a process and apparatus for drying polymeric material to be melted and utilized to form polymeric articles.

Dryers including drying hoppers have been utilized in the plastics industry for years. These dryers provide heated, dehumidified air to a drying hopper. Polymeric material, e.g., resin pellets, contained in the drying hopper are exposed to the heated, dehumidified air such that moisture is removed from the pellets. If moisture is not removed from the surface and interior of the pellets before the pellets are melted and formed into parts, the quality of resulting parts may be unacceptable.

Thus, the amount of time polymeric material remains in a drying hopper before being delivered to one or more processing machines located downstream from the dryer can impact the quality of parts formed by the processing machines. If polymeric material remains in the drying hopper too long, it may degrade. If polymeric material leaves the drying hopper too soon, wet material reaches the processing machines which, as noted above, can adversely impact the quality of parts formed by the processing machines.

There is a need for an improved control system which is capable of causing polymeric material to be delivered to a drying hopper at approximately the same rate at which material is actually removed from the drying hopper.

SUMMARY OF THE INVENTION

This need is met by the present invention wherein a dryer is provided having load cell apparatus coupled to a drying hopper, support structure and a controller. The load cell apparatus generates on an on-going basis signals indicative of the weight of the drying hopper and its contents. Those signals are received by the controller which determines from those signals the weight of the contents within the hopper and compares the weight of the contents to a weight threshold value calculated by the controller. The controller causes a material supply device to provide additional polymeric material to the drying hopper when the weight of the contents in the drying hopper is below the weight threshold value.

In accordance with a first aspect of the present invention, a drying hopper assembly is provided which is adapted to be mounted to a support structure. The drying hopper assembly comprises a drying hopper and load cell apparatus. The drying hopper is capable of receiving wet polymeric material to be dried. The load cell apparatus is associated with the support structure and the drying hopper for sensing the weight of the drying hopper and any material contained therein. The load cell apparatus may comprise one or more load cells coupled to the drying hopper and the support structure.

In accordance with a second aspect of the present invention, a dryer is provided which is adapted to receive and dry polymeric material. The dryer comprises a support structure, a drying hopper assembly, a polymeric material supply device and a controller. The drying hopper assembly includes a drying hopper having an inlet for receiving wet polymeric material to be dried and an outlet through which dry polymeric material exits the hopper, and load cell apparatus associated with the support structure and the drying hopper for sensing the weight of the drying hopper and any polymeric material contained therein. The load cell apparatus generates first signals representative of the weight of the drying hopper and any contents it may have. The polymeric material supply device is adapted to supply wet polymeric material to the drying hopper through the material inlet. The controller is coupled to the polymeric material supply device and the load cell apparatus. It receives the first signals generated by the load cell apparatus and controls the operation of the polymeric material supply device based thereon.

The load cell apparatus may comprise three load cells and a summing device. The load cells are coupled to the drying hopper and the support structure. They sense the weight of the drying hopper and any polymeric material contained therein and generate second signals representative of the weight. The summing device is coupled to the three load cells and the controller. It receives the second signals, adds the second signals together and generates a combined signal which defines a first signal received by the controller.

The polymeric material supply device may comprise a source of wet polymeric material, a vacuum-driven loader and a first conduit. The loader is coupled to the controller and the drying hopper. The first conduit extends to the wet polymeric material source and is coupled to the vacuum-driven loader.

Preferably, the controller receives the first signals generated by the load cell apparatus, determines the weight of the contents within the hopper from the first signals, compares the weight of the contents within the drying hopper to a weight threshold value calculated by the controller, and causes the material supply device to provide additional polymeric material to the drying hopper when the weight of the contents within the drying hopper is below the weight threshold value.

Alternatively, the controller may compare the first signals which are indicative of the weight of the drying hopper and its contents to a combined weight threshold value calculated by the controller, and cause the material supply device to provide additional material to the hopper when the weight of the hopper and its contents is below the combined weight threshold value.

In accordance with a third aspect of the present invention, a dryer system is provided for receiving wet granular polymeric material, drying the granular polymer material and providing the dry granular polymeric material to one or more processing machines. The dryer system comprises a support structure and a drying hopper assembly. The hopper assembly includes a drying hopper having a gas inlet, a gas outlet, an inlet for receiving wet granular polymeric material to be dried and an outlet through which dry granular polymeric material exits the hopper, and load cell apparatus associated with the support structure and the drying hopper for sensing the weight of the drying hopper and any polymeric material contained therein. The load cell apparatus generates first signals representative of the weight of the drying hopper and any contents it may have. The dryer system further comprises a source for supplying dry gas to the gas inlet, a polymeric material supply device, a material dispensing device, a loading device, and a controller. The polymeric material supply device is adapted to provide wet granular polymeric material to the drying hopper through the material inlet. The material dispensing device is coupled to the outlet of the drying hopper for receiving and dispensing the dry polymeric material exiting from the hopper outlet. The loading device is coupled to a processing machine and the material dispensing device for receiving dry polymeric material from the material dispensing device and delivering the dry polymeric material to the processing machine. The controller is coupled to the polymeric material supply device and the load cell apparatus for receiving the first signals generated by the load cell apparatus and controlling the operation of the polymeric material supply device based thereon. The controller is further coupled to the material dispensing device and the loading device for controlling the dispensing of the dry material from the dispensing device to the loading device.

The loading device may comprise a vacuum-driven loader having an inlet and an outlet, one or more first hoses extending between the material dispensing device and the loader inlet, a substantially transparent holding tube extending between the loader outlet and the processing machine, and a material level sensor. Dry polymeric material passes through the holding tube as it travels from the loader to the processing machine. The material level sensor is positioned adjacent to the holding tube and coupled to the controller. The sensor generates a call signal to the controller when the level of the dry polymeric material within the holding tube falls below a predefined threshold level.

The material dispensing device may comprise a slidegate, a first hose and a probe box. The slidegate has an inlet and an outlet and is coupled to the controller. The first hose is positioned between and coupled to the drying hopper outlet and the slidegate inlet. The probe box is coupled to the slidegate outlet and has an inner cavity adapted to receive polymeric material passing through the slidegate. The controller generates a dispensing signal to the slidegate upon receiving a call signal from the material level sensor causing the slidegate to open for predefined period of time to allow dry polymeric material to pass therethrough.

BRIEF DESCRIPTION OF THE DRAWINGS

FIGS. 4 and 5 are front and side views respectively of a loader for supplying dry polymeric material to a processing machine.

DETAILED DESCRIPTION OF THE PREFERRED EMBODIMENT

Figure 1:
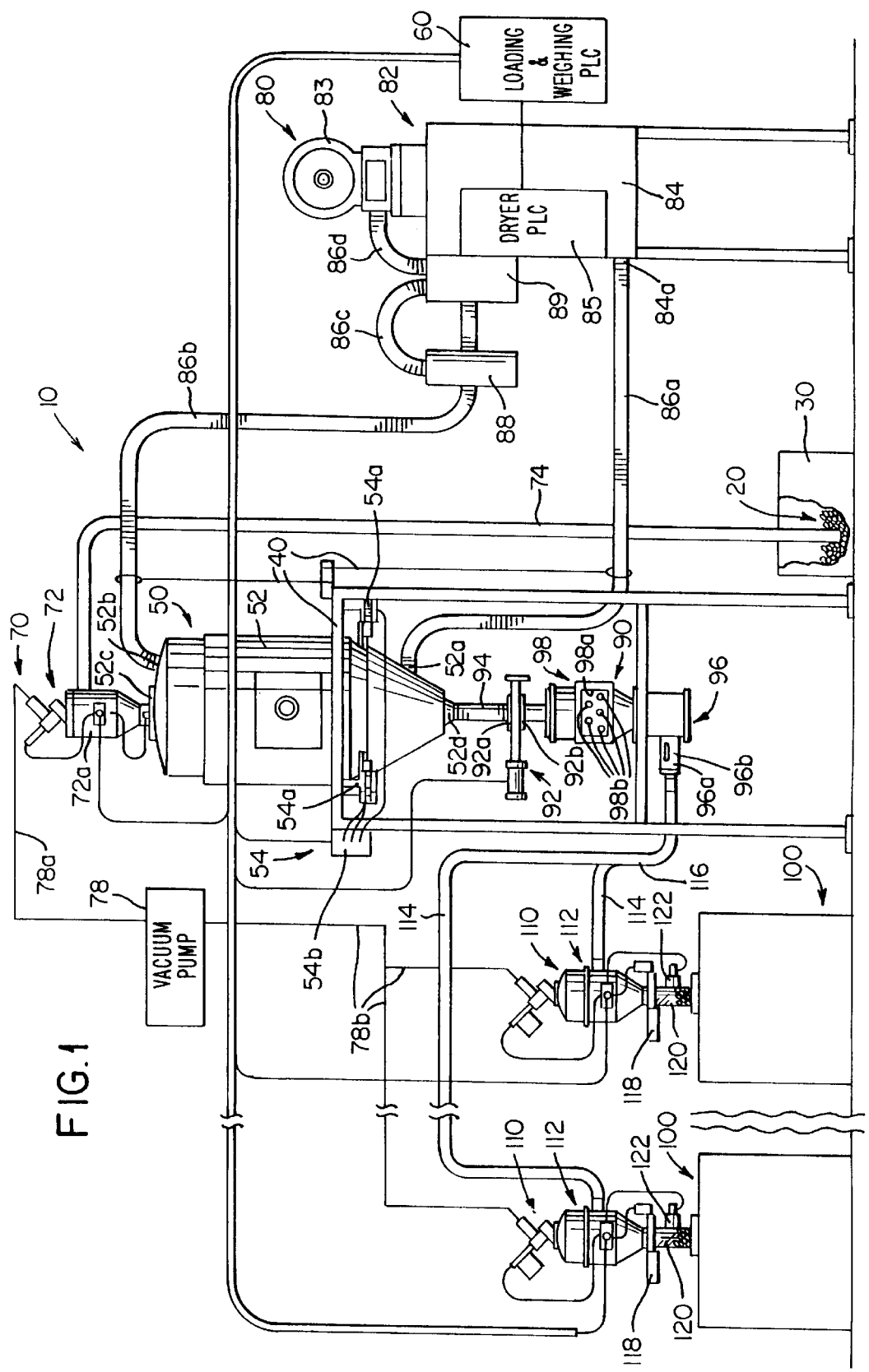
FIG. 1 is a front view of a dryer system constructed in accordance with the present invention.

A dryer system 10 constructed in accordance with the present invention is illustrated in FIG. 1. As will be discussed more explicitly below, the dryer system 10 pulls wet granular polymeric material 20 from a source 30, such as a box of polymeric material 20, dries the granular polymer material 20, and provides the dry granular polymeric material 20 to one or more processing machines 100, two of which are shown schematically in FIG. 1. The processing machines 100 may comprise, for example, conventional injection molding or extrusion machines.

The dryer system 10 comprises a support structure 40 and a drying hopper assembly 50. The hopper assembly 50 includes a drying hopper 52 having an inner cavity (not shown) adapted to receive wet granular polymeric material 20. The hopper 52 further includes a gas inlet 52a, a gas outlet 52b, an inlet 52c for receiving the wet granular polymeric material 20 to be dried and an outlet 52d through which dry granular polymeric material 20 exits the hopper 52. The inlets 52a and 52c and the outlets 52b and 52d communicate with the drying hopper inner cavity.

Figure 3:
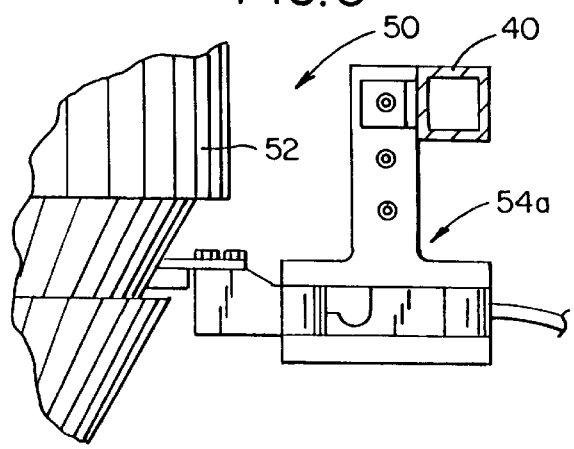
FIG. 3 is a side view of a load cell coupled between support structure and the drying hopper.

The drying hopper assembly 50 further includes load cell apparatus 54 associated with the support structure 40 and the drying hopper 52 for sensing the weight of the drying hopper 52 and any polymeric material 20 contained therein. In the illustrated embodiment, the load cell apparatus 54 comprises first, second and third load cells 54a (only two load cells 54a are shown in FIG. 1) bolted or otherwise coupled to the support structure 40 and the drying hopper 52, see also FIG. 3. Thus, the three load cells 54a mount the drying hopper 52 to the support structure 40. They further sense the weight of the drying hopper 52 and any contents contained within its inner cavity and generate second signals representative of the weight of the drying hopper 52 and its contents. The load cell apparatus 54 further includes a conventional summing device 54b which is electrically coupled to each of the three load cells 54a and a conventional programmable logic controller 60 or other processor based controller. The summing device 54b receives the second signals generated by the three load cells 54a, adds the second signals together and generates a combined signal which defines a first signal received by the controller 60. As will be discussed further below, the controller 60, which is coupled to the summing device 54b and a polymeric material supply device 70, uses the first signals to control the operation of the supply device 70. The supply device 70, as will be discussed more explicitly below, provides wet granular polymeric material to the drying hopper 52. Each of the three load cells 54a comprises a conventional single point load cell made of aluminum, which is commercially available from PTC Electronics of Wyckoff, N.J., under the product designation "Scaime Load Cell: Model AG100U-3M." The summing device 54b comprises a conventional four-channel signal trim junction box, which is commercially available from Rice Lake Weighing Systems, Inc. Rice Lake, Wis., under the product designation "Rice Lake Load Cell Summing Box: Model 23127."

It is further contemplated that one, two or four or more load cells 54a may be provided.

The dryer system 10 further comprises a source 80 for supplying dry gas to the gas inlet 52a of the drying hopper 52, the polymeric material supply device 70, a material dispensing device 90, a loading device 110 for each processing machine 100, and the controller 60.

Figure 2:
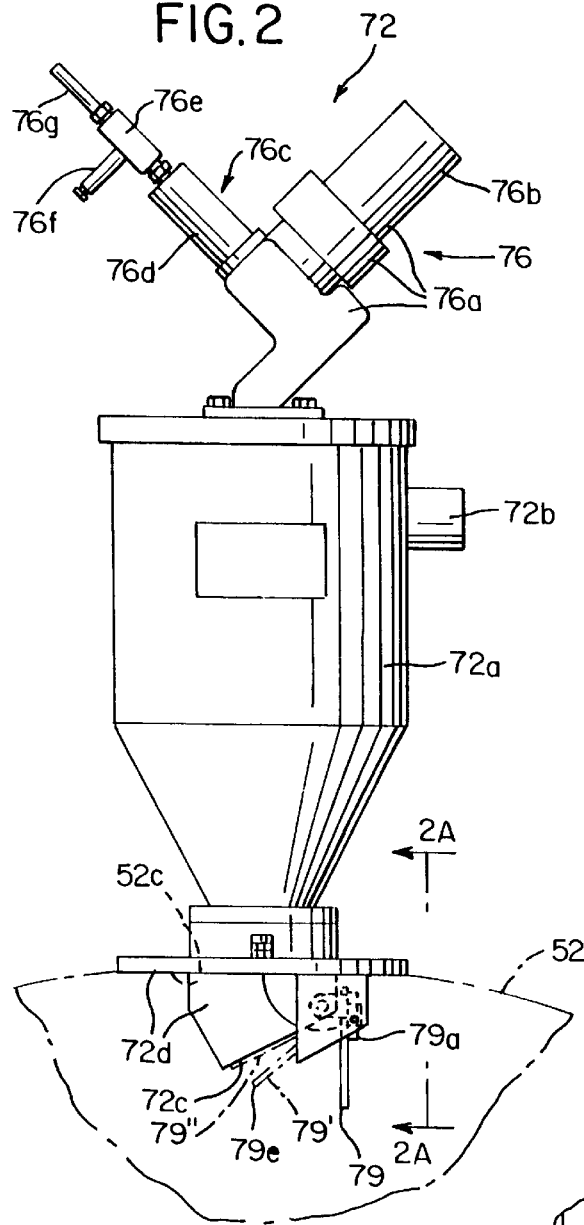
FIG. 2 is a side view of a vacuum-driven loader for supplying polymeric material to a drying hopper.
Figure 2A:
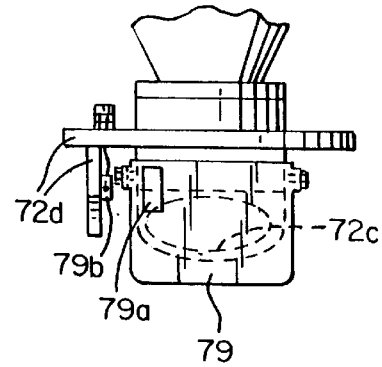
FIG. 2A is a view taken along view line 2A—2A in FIG. 2.

As noted above, the polymeric material supply device 70 is adapted to provide wet granular polymeric material 20 to the drying hopper 52 through the material inlet 52c. The supply device 70, in the illustrated embodiment, comprises the source 30 of wet polymeric material 20, a vacuum-driven loader 72 and a first supply conduit 74. As shown in FIGS. 1, 2 and 2A, the loader 72 comprises a cannister 72a having an inner cavity (not shown), an inlet 72b for receiving wet granular polymeric material 20, an outlet 72c through which the material 20 leaves the cannister 72a and enters the drying hopper 52, and a vacuum control device 76. The cannister 72a is bolted or otherwise secured to the drying hopper 52 such that its outlet 72c extends into the drying hopper 52 through the drying hopper inlet 52c, see FIG. 2. The first conduit 74 is connected to the inlet 72b such that it provides a path for wet polymeric material 20 to travel from the source 30 to the cannister inner cavity.

The vacuum control device 76 comprises a main body portion 76a which is bolted or otherwise coupled to the cannister 72a. The main body portion 76a includes a bore (not shown) formed therein, an inlet 76b which defines a portion of the bore and a valve assembly 76c. The main body portion bore communicates with an opening (not shown) formed in the cannister 72a. A vacuum source 78 communicates with the main body portion bore via a conduit 78a connected to the inlet 76b. The valve assembly 76c comprises a pneumatic piston/cylinder unit 76d, a reciprocating polyurethane blocking plate (not shown) coupled to the piston of the unit 76d and a control valve 76e. The blocking plate is movable between open and closed positions via the piston of the piston/cylinder unit 76d. When the plate is in its closed position, the main body portion bore is blocked such that the vacuum source 78 is not permitted to communicate with the cannister inner cavity. When the plate is in its open position, the main body portion bore is open to allow the vacuum source to communicate with the cannister inner cavity and, hence, the first conduit 74. The vacuum causes wet granular polymeric material to be pulled from the source 30 through the first conduit 74 into the cannister 72a.

The control valve 76e is coupled to the controller 60 via connector 76f and to a low pressure air source (not shown) via connector 76g. When the controller 60 sends a voltage signal to the control valve 76e, it causes the control valve 76e to open so as to allow low pressure air to communicate with the piston/cylinder unit 76d. The low pressure air causes the piston of the unit 76d to move the plate forward from its closed position to its open position. When the voltage signal is removed by the controller 60 from the control valve 76e, air from the low pressure air source is prevented from reaching the piston/cylinder unit 76d, resulting in the plate returning to its normally closed position. A spring (not shown) is provided in the piston/cylinder unit 76d to return the plate back to its home or closed position.

A plate 79 is pivotably connected to a lower portion 72d of the cannister 72a. The plate 79 is provided with a magnet 79a which serves as a counter-weight such that an edge 79e of the plate 79 is normally positioned about 0.375 inch from the outlet 72c, see plate 79' shown in phantom in FIG. 2. When the vacuum source 78 communicates with the cannister inner cavity, the less-than-atmospheric air pressure created by the vacuum source 78 causes the plate 79 to move against the cannister lower portion 72d, see plate 79" shown in phantom in FIG. 2, to close the outlet 72c. The closed plate 79 allows the negative air pressure created by the vacuum source 78 to pull wet granular material 20 from the source 30, through the first conduit 74 and into the cannister inner cavity.

A conventional reed switch 79b is fixed to the lower portion 72d of the cannister 72. It senses the magnet 79a when the plate 79 is positioned generally vertically as shown in solid line in FIG. 2. The plate 79 assumes this vertical position when the inner cavity of the drying hopper 52 is completely filled with polymeric material 20. The switch 79b, upon sensing the magnet 79a, generates a supply stop signal to the controller 60 which, in turn, deactivates the voltage signal to the control valve 76e so as to prevent further material from entering the cannister 72a.

When the vacuum source 78 no longer communicates with the cannister inner cavity, the weight of the granular material 20 within the cannister 72a forces the plate 79 away from the lower portion 72d of the cannister 72a such that the polymeric material 20 within the cannister inner cavity leaves the cannister 72a and passes into the drying hopper 52.

Heated, dehumidified gas, air in the illustrated embodiment, is provided to the drying hopper 52 by the dry gas source 80. The source 80 comprises a conventional dryer 82 including a blower 83 and a container 84 having two chambers (not shown), each filled with desiccant material. A regeneration heater (not shown) is provided in each chamber for drying the desiccant material therein. It is also contemplated that the regeneration heaters may be located outside of the two chambers. Only one chamber is used at any given time to remove moisture from air passing through the container 84. A regeneration heater is activated to dry the desiccant material in its associated chamber only when that chamber is not in use. The container further includes a process air heater (not shown) provided in the container 84 for heating the air just before the air leaves the container 84. The container 84 may further include a conventional dew point sensor (not shown) located between the container 84 and the hopper 52 and within a first dry gas source conduit 86a.

The first conduit 86a extends between and is coupled to an outlet 84a of the container 84 and the drying hopper inlet 52a. A second conduit 86b extends between and is coupled to the drying hopper outlet 52b and a conventional filter 88. A third conduit 86c extends between and is coupled to the filter 88 and a cooling station 89 where returning air is cooled. A fourth conduit 86d extends between and is coupled to the cooling station 89 and the blower 83. Heated, dehumidified air leaves the container 84 through the outlet 84a and passes through the conduit 86a to the drying hopper 52. The heated air removes moisture from the granular polymeric material 20 contained within the drying hopper 52. The moist air exits the hopper 52 through the outlet 52b. It travels from the outlet 52b, through the conduit 86b to the filter 88. From the filter 88, the air travels through the cooling station 89 and back into the container 84 where moisture is removed from the air. The air is also heated in the container 84 before it exits the container 84 through the outlet 84a. The source further includes a conventional controller 85 which controls the operation of the blower 83, the regeneration heaters within the two chambers and the process air heater positioned just before the outlet 84a. It also receives signals generated by the dew point sensor which are indicative of the dryness of the air passing out from the chambers. If the wetness of the air is above a predetermined threshold value, the controller 85 activates a visual and/or an audible alarm.

The material dispensing device 90 is coupled to the outlet 52d of the drying hopper 52 for receiving and dispensing the dry polymeric material 20 exiting from the hopper outlet 52d. In the illustrated embodiment, the weight of the dispensing device 90 is supported completely by the structure 40. Hence, the drying hopper 52 does not support any significant portion of the weight of the dispensing device 90.

In the illustrated embodiment, the dispensing device 90 comprises a pneumatic slidegate 92, a first hose 94 which is flexible and expandable, a probe box 96, a probe 96a, and a metal removal box 98. The slidegate 92 has an inlet 92a and an outlet 92b and is coupled to the controller 60. The slidegate 92 is commercially available from Salina Vortex Corporation, Salina, Kan.,. under the product designation "Orifice Gate Valve: Model HA02." It is also contemplated that a conventional pinch valve could be used in place of the slidegate 92. An example pinch valve is one which is commercially available from Red Valve Company, Inc., Pittsburgh, Pa., under the product designation "Type A-valve, Series 2600, Miniflex Valve (2 inch valve size)." The first hose 94 is positioned between and coupled to the drying hopper outlet 52d and the slidegate inlet 92a. It defines an unobstructed path for the polymeric material 20 to move from the drying hopper to the slidegate 92. The metal removal box 98 is coupled to the slidegate outlet 92b and to an inlet of the probe box 96. It has an inner passage 98a through which the granular material 20 passes into the probe box 96. The removal box 98 further includes a plurality of magnets 98b which extend into the inner passage 98a. The magnets 98b attract iron and steel particles which may be on the outer surfaces of or mixed in with the granular polymeric material 20 such that those metal particles are removed from the material 20 before the material 20 enters the probe box 96. Upon receiving a dispense signal from the controller 60, the slidegate 92 opens for a predefined amount of time to allow dry granular polymeric material 20 to move into the probe box 96. As will be discussed below, one of the loading devices 110 will pull via negative pressure the polymeric material 20 from the probe box 96, through the probe 96a and into the loading device 110.

Referring now to FIGS. 1, 4 and 5, each loading device 110 comprises a vacuum-driven loader 112, a first hose 114 extending between and coupled to the loader 112 and a second hose 116, a slidegate 118, a substantially transparent holding tube 120, preferably made from "Pyrex" glass which is commercially available from Dow Corning, extending between the slidegate 118 and the processing machine 100, and a material level sensor 122 positioned adjacent to the holding tube 120. The second hose 116 is coupled to the probe 96a such that the first and second hoses 114 and 116 provide a path for polymeric material to travel from the probe 96a to the loader 112. The slidegate 118 comprises a plate which is caused to reciprocate back and forth by a pneumatic cylinder so as to allow polymeric material to pass from the loader 112 into the holding tube 120. The material level sensor 122 is a conventional capacitive sensor, which is commercially available from Turck, Inc. Minneapolis, Min., under the product designation Low Level Probe: Model BC20K40SRVN4X2."

The loader 112 comprises a cannister 112a having an inner cavity (not shown), an inlet 112b for receiving dry granular polymeric material 20, an outlet 112c through which the material 20 leaves the cannister 112a and enters the slidegate 118 and a vacuum control device 124. The cannister 112a is bolted or otherwise secured to its corresponding processing machine 100. The first hose 114 is connected to the inlet 112b.

The vacuum control device 124 comprises a main body portion 124a which is bolted or otherwise coupled to the cannister 112a. The main body portion 124a includes a bore (not shown) formed therein, an inlet 124b which defines a portion of the bore and a valve assembly 124c. The main body portion bore communicates with an opening (not shown) formed in the cannister 112a. The vacuum source 78 communicates with the main body portion bore via a conduit 78b connected to the inlet 124b. The valve assembly 124c comprises a pneumatic piston/cylinder unit 124d, a polyurethane blocking plate (not shown) coupled to the piston of the unit 124d and a control valve 124e. The blocking plate is movable between open and closed positions via the piston of the piston/cylinder unit 124d. When the plate is in its closed position, the main body portion bore is blocked such that the vacuum source 78 is not permitted to communicate with the cannister inner cavity. When the plate is in its open position, the main body portion bore is open to allow the vacuum source 78 to communicate with the cannister inner cavity and, hence, the first and second hoses 114 and 116 and the probe 96a. The vacuum causes dry granular polymeric material 20 to be pulled from the probe box 96 through the probe 96a and the first and second hoses 114 and 116 and into the cannister 112a. The slidegate 118 closes off the outlet 112c of the loader 112 during material loading into the cannister 112a.

The control valve 124e is coupled to the controller 60 via connector 124f and to a low pressure air source (not shown) via connector 124g. When the controller 60 sends a voltage signal to the control valve 124e, it causes the control valve 124e to open so as to allow low pressure air to communicate with the piston/cylinder unit 124d. The low pressure air causes the piston of the unit 124d to move the plate from its closed position to its open position. When the voltage signal is removed by the controller 60 from the control valve 124e, air from the low pressure air source is prevented from reaching the piston/cylinder unit 124d, resulting in the plate returning to its normally closed position via a spring (not shown) provided in the piston/cylinder unit 124d.

Upon receiving a supply signal from the controller 60, the slidegate 118 opens for a predefined amount of time to allow dry granular polymeric material 20 to move into the holding tube 120. The dry material 20 passes into the holding tube 120 so as to be available for use by the processing machine 100.

The material level sensor 122 is positioned adjacent to the holding tube 120 and is coupled to the controller 60. The sensor 122 generates a call signal to the controller 60 when the level of the dry polymeric material 20 within the holding tube 120 falls below a predefined threshold level. Thus, a ready supply of polymeric material 20 is stored in the holding tube 120 for use by the processing machine 100 during operation of the machine 100 and the system 10.

Operation of the dryer system 10 will now be described. During a calibration procedure, the controller 60 polls the load cell apparatus 54 when the drying hopper is completely empty, i.e., without any granular polymeric material 20 present in the drying hopper 52, so as to determine the weight of the empty hopper 52. The hopper 52 is then filled with a desired amount of polymeric material 20. The controller 60 again polls the load cell apparatus 54 to determine the combined weight of the hopper 52 and its contents. The controller 60 then determines the weight of the polymeric material 20 in the hopper 52 (i.e., a calibrated weight) by subtracting the weight of the empty hopper from the weight of the filled hopper. The calibration procedure may be performed before the system 10 is initially operated and thereafter on an as needed basis.

After calibration has been completed and before material 20 is removed from the hopper 52, heated air is provided to the hopper 52 by the dry gas source 80 for a time period, e.g., four hours, sufficient to dry the material 20 contained in the hopper 52.

After the initial start-up drying period has been completed, regular operation of the system commences with material 20 being removed from the hopper 52. The controller 60 then periodically performs start-up polling events (e.g., every 10 minutes) whereby it polls the load cell apparatus 54 one or more times to determine the combined weight of the hopper 52 and its contents. After each polling of the load cell apparatus 54, the controller 60 determines the weight of the material 20 in the hopper 52, compares this amount to the calibrated weight, i.e., the material in the hopper 52 when the hopper 52 was full, and generates a voltage signal to the control valve 76e for a fixed time period, e.g., 10 seconds, sufficient to cause a load of polymeric material 20 to be pulled via negative pressure (i.e., below atmospheric pressure) into the cannister 72a. After the voltage signal is removed from the control valve 76e, the material 20 pulled into the cannister 72a drops via gravity into the drying hopper 52. The controller 60 then polls the load cell apparatus 54 again to determine if the weight of the material in the hopper 52 is equal to or greater than the calibrated weight. If not, it will generate another voltage signal for the same fixed time period to the control valve 76e resulting in further material 20 entering into the hopper 52. The controller 60 continues to poll the load cell apparatus 54 during each start-up polling event until the hopper 52 is filled with material 20 equal to or greater than the calibrated weight. Preferably, one to three start-up polling events are performed.

After the one or more start-up polling events have been completed, the controller 60 periodically conducts regular operation polling events (e.g., every 10 minutes). During a regular operation polling event, the controller 60 determines the weight of the material 20 in the hopper 52 and calculates a material usage rate. The usage rate may be calculated by summing the weight of the material dispensed from the hopper 52 between adjacent pairs of polling events, including start-up polling events, occurring within a time period extending up to the current polling event, which time period does not exceed, for example, one hour, and dividing the total summed weight by the time period. Assuming that there are three start-up polling events and the time period before each start-up and regular operation polling event is 10 minutes, the time periods for the first and second regular operation polling events will be forty minutes and fifty minutes, respectively. Alternatively, the controller 60 may determine the usage rate by summing the weights of a preselected number of samples, dividing the summation of those weights by the number of samples used and multiplying this number by the number of samples taken per hour.

The controller 60 then determines how much material should be in the hopper 52 to enable the one or more processing machines 100 currently being utilized to continue to operate at the calculated usage rate for a specified first time period, e.g., 6 hours. Hence, the controller 60 multiplies the calculated material usage rate by the first time period (6 hours). It also calculates how much material should be in the hopper 52 to enable the one or more processing machines 100 currently being utilized to continue to operate at the calculated usage rate for a specified second time period which is less than the first time period, e.g., 5 hours. The controller 60 multiplies the calculated material usage rate by the second time period (5 hours) such that a weight threshold value is determined.

After the weight threshold value is calculated, the controller 60 determines if the material currently in the hopper 52, as determined during the current regular operation polling event, is below the weight threshold value, i.e., the amount of material needed to keep the processing machines 100 operational for the second time period. If the weight of the material currently in the hopper 52 is less than the weight threshold value, the controller 60 generates a voltage signal to the control valve 76e for a fixed time period, e.g., 10 seconds, causing a load or load cycle of polymeric material 20 to be pulled via negative pressure (i.e., below atmospheric pressure) into the cannister 72a. After the voltage signal is removed from the control valve 76e, the material 20 pulled into the cannister 72a drops via gravity into the drying hopper 52. The controller 60 then polls the load cell apparatus 54 again to determine if the weight of the material in the hopper 52 is equal to or greater than the weight threshold value. If not, it will generate another voltage signal to the control valve 76e resulting in further material 20 entering into the hopper 52. The controller 60 continues to poll the load cell apparatus 54 during each regular operation polling event until the weight of the material in the hopper 52 is equal to or greater than the weight threshold value.

If the weight of the material currently in the hopper 52, as determined during the current regular operation polling event, is equal to or greater than the weight threshold value, the controller 60 does not generates a voltage signal to the control valve 76e.

The second time period should be greater than or equal to the amount of time the specific material 20 being used needs to remain in the hopper 52 so as to be dried sufficiently for use by the processing machines 100. Also, the second time period should not exceed a time period after which the material 20 begins to degrade. The first time period should be set such that the amount of material 20 required to keep the machines 100 running during this time period is equal to or less than the maximum amount of material 20 that the hopper 52 will hold.

As one of the processing machines 100 pulls dry granular polymeric material 20 from its corresponding holding tube 120, the level of material 20 in the tube 120 will eventually fall below a threshold level causing the sensor 122 to generate a call signal to the controller 60. In response, the controller 60 generates a dispense signal to the slidegate 92 causing the slidegate 92 to open for a predefined period of time, e.g., 1.5 seconds, to allow dry granular polymeric material 20 to move via gravity into the probe box 96. The controller 60 polls the load cell apparatus 54 just before and after the slidegate 92 is opened to determine the weight of the material 20 dispensed into the probe box 96 and to be delivered to the loading device 110. The controller 60 may keep track of the total amount of material 20 delivered to each loading device 110 during a predetermined period of time, e.g., an eight hour shift, or it may keep a running total which is reset by the operator.

After the slidegate 92 has closed, the controller 60 generates a voltage signal to the control valve 124e for a predetermined period of time causing the polymeric material 20 in the probe box 96 to be pulled via negative pressure (i.e., below atmospheric pressure) into the cannister 112a. After the voltage signal is removed from the control valve 124e, the controller 60 generates a supply signal to the slidegate 118 causing it to dispense the material 20 pulled into the cannister 112a to the holding tube 120.

The same sequence of steps occurs each time one of the sensors 122 generates a call signal to the processor 60. However, only one cannister 112a is loaded at any given time.

The controller 60 may be programmed to allow an operator to input into the controller 60 commands concerning whether the slidegate 92 should be operational for each or only a specified number of processing machines 100 (the slidegate 92 is disabled for a given processing machine 100 if that machine 100 is receiving dry material 20 from another material source other than the hopper 52 illustrated in FIG. 1); enablement commands for each loading device 110; a loadtime, i.e., the length of time that a voltage signal is applied to the control valve 124e for each loading device 110; and a start command after calibration has been initiated, i.e., after the weight of the drying hopper 52 before and after it is filled has been determined.

The processor 60 may include a conventional display (not shown) or screen which displays any one or all of the following: 1) the amount of material 20 by weight passing through the slidegate 92 and received by each loading device 110 over a predefined time period; 2) the amount of material by weight currently in the drying bin 52; 3) the amount of material 20 that was pulled into the hopper 52 between the last two periodic polling events which, in the illustrated embodiment, occur every 10 minutes; 4) the first and second time period material weights; 5) the amount of material by weight that was removed from the hopper 52 during the last loading cycle, i.e., after a call signal was generated by one of the sensors 122; 6) the processing machines 100 for which the slidegate 92 is enabled; 7) the loading devices 110 that are enabled, i.e., operational; 8) the loadtime for each loading device 110, which may vary from one loading device 110 to another; and 9) the status of each loading device 110. The status of each loading device 110 might involve displaying whether the loading device 110 is inactive, inoperable or active, i.e., enabled but not calling or loading; calling, i.e., its corresponding sensor 122 has sent a call signal to the controller 60; or loading, i.e., it is in the process of receiving material 20.

What is claimed is:

1. A dryer adapted to receive and dry polymeric material comprising:
    a support structure;
    a drying hopper assembly including a drying hopper having an inlet for receiving wet polymeric material to be dried and an outlet through which dry polymeric material exits said hopper, and load cell apparatus associated with said support structure and said drying hopper for sensing the weight of said drying hopper and any polymeric material contained therein, said load cell apparatus generating first signals representative of said weight;
    a polymeric material supply device which is adapted to supply wet polymeric material to said drying hopper through said material inlet; and
    a controller coupled to said polymeric material supply device and said load cell apparatus for receiving said first signals generated by said load cell apparatus and controlling the operation of said polymeric material supply device based thereon.

2. A dryer as set forth in claim 1, wherein said load cell apparatus comprises at least one load cell coupled to said drying hopper and said support structure.

3. A dryer as set forth in claim 1, wherein said load cell apparatus comprises:
    three load cells coupled to said drying hopper and said support structure for sensing the weight of said drying hopper and any polymeric material contained therein and generating second signals representative of said weight; and
    a summing device coupled to said three load cells and said controller for receiving said second signals, adding said second signals together and generating a combined signal which defines said first signal received by said controller.

4. A dryer as set forth in claim 1, wherein said polymeric material supply device comprises:
    a source of wet polymeric material;
    a vacuum-driven loader coupled to said controller and said drying hopper; and
    a first conduit extending to said wet polymeric material source and coupled to said vacuum-driven loader.

5. A dryer as set forth in claim 1, wherein said controller receives said first signals generated by said load cell apparatus, determines the weight of the contents within the hopper from said first signals, compares said weight to a weight threshold value calculated by said controller and causes said material supply device to provide additional polymeric material to said drying hopper when said weight is below said weight threshold value.

6. A dryer adapted to receive and dry granular polymeric material comprising:
    a support structure;
    a drying hopper assembly including a drying hopper having a gas inlet, a gas outlet, an inlet for receiving wet granular polymeric material to be dried and an outlet through which dry polymeric material exits said hopper, and load cell apparatus associated with said support structure and said drying hopper for sensing the weight of said drying hopper and any polymeric material contained therein, said load cell apparatus generating first signals representative of said weight;
    a source for supplying dry gas to said gas inlet;
    a polymeric material supply device which is adapted to provide wet granular polymeric material to said drying hopper through said material inlet; and
    a controller coupled to said polymeric material supply device and said load cell apparatus for receiving said first signals generated by said load cell apparatus and controlling the operation of said polymeric material supply device based thereon.

7. A dryer as set forth in claim 6, wherein said load cell apparatus comprises at least one load cell coupled to said drying hopper and said support structure.

8. A dryer as set forth in claim 6, wherein said load cell apparatus comprises:
    three load cells coupled to said drying hopper and said support structure for sensing the weight of said drying hopper and any polymeric material contained therein and generating second signals representative of said weight; and
    a summing device coupled to said three load cells and said controller for receiving said second signals, adding said second signals together, and generating a combined signal which defines said first signal which is received by said controller.

9. A dryer as set forth in claim 6, wherein said polymeric material supply device comprises:
    a source of wet granular polymeric material;
    a vacuum-driven loader coupled to said controller; and
    a first conduit extending to said polymeric material source and coupled to said vacuum-driven loader.

10. A dryer as set forth in claim 6, wherein said controller receives said first signals generated by said load cell apparatus, determines the weight of the contents within the hopper from said first signals, compares said weight to a weight threshold value calculated by said controller and causes said material supply device to provide additional polymeric material to said drying hopper when said weight is below said weight threshold value.

11. A dryer system for receiving wet granular polymeric material, drying the granular polymer material and providing the dry granular polymeric material to a processing machine, said dryer system comprising:
    a support structure;
    a drying hopper assembly including a drying hopper having a gas inlet, a gas outlet, an inlet for receiving wet granular polymeric material to be dried and an outlet through which dry granular polymeric material exits said hopper, and load cell apparatus associated with said support structure and said drying hopper for sensing the weight of said drying hopper and any polymeric material contained therein and generating first signals representative of said weight;
    a source for supplying dry gas to said gas inlet;

a polymeric material supply device which is adapted to provide wet granular polymeric material to said drying hopper through said material inlet;

a material dispensing device coupled to said outlet of said drying hopper for receiving and dispensing said dry polymeric material exiting from said hopper outlet;

a loading device coupled to a processing machine and said material dispensing device for receiving dry polymeric material from said material dispensing device and delivering said dry polymeric material to said processing machine; and a controller coupled to said polymeric material supply device and said load cell apparatus for receiving said first signals generated by said load cell apparatus and controlling the operation of said polymeric material supply device based thereon, said controller further being coupled to said material dispensing device and said loading device for controlling the dispensing of said dry material from said dispensing device to said loading device.

12. A dryer system as set forth in claim 11, wherein said load cell apparatus comprises at least one load cell coupled to said drying hopper and said support structure.

13. A dryer system as set forth in claim 11, wherein said load cell apparatus comprises:

three load cells coupled to said drying hopper and said support structure for sensing the weight of said drying hopper and any polymeric material contained therein and generating second signals representative of said weight; and a summing device coupled to said three load cells and said controller for receiving said second signals, adding said second signals together, and generating a combined signal which defines said first signal which is received by said controller.

14. A dryer system as set forth in claim 11, wherein said polymeric material supply device comprises:

a source of wet granular polymeric material;

a vacuum-driven loader coupled to said controller; and a first conduit extending to said polymeric material source and coupled to said vacuum-driven loader.

15. A dryer system as set forth in claim 11, wherein said controller receives said first signals generated by said load cell apparatus, determines the weight of the contents within the hopper from said first signals, compares said weight to a weight threshold value calculated by said controller and causes said material supply device to provide additional polymeric material to said drying hopper when said weight is below said weight threshold value.

16. A dryer system as set forth in claim 11, wherein said loading device comprises:

a vacuum-driven loader having an inlet and an outlet;

a substantially transparent holding tube extending between said loader outlet and said processing machine through which said dry polymeric material passes as it travels from said loader to said processing machine; and a material level sensor positioned adjacent to said holding tube and coupled to said controller, said material level sensor generating a call signal to said controller when the level of said dry polymeric material within said holding tube falls below a predefined threshold level.

17. A dryer system as set forth in claim 16, wherein said material dispensing device comprises:

a slidegate having an inlet and an outlet and being coupled to said controller;

a first hose positioned between and coupled to said drying hopper outlet and said slidegate inlet;

a probe box coupled to said slidegate outlet and having an inner cavity adapted to receive polymeric material passing through said slidegate; and wherein said controller generates a dispensing signal to said slidegate upon receiving a call signal from said material level sensor causing said slidegate to open for predefined period of time to allow dry polymeric material to pass therethrough.

* * * * *